(12) United States Patent
Gay et al.

(10) Patent No.: US 12,346,961 B2
(45) Date of Patent: **\*Jul. 1, 2025**

(54) FINANCIAL MANAGEMENT USING AUGMENTED REALITY SYSTEMS

(71) Applicant: INTUIT INC., Mountain View, CA (US)

(72) Inventors: Stephen R. Gay, Redwood City, CA (US); Tony Chang, Hillsboro, OR (US)

(73) Assignee: Intuit Inc., Mountain View, CA (US)

( * ) Notice: Subject to any disclaimer, the term of this patent is extended or adjusted under 35 U.S.C. 154(b) by 733 days.

This patent is subject to a terminal disclaimer.

(21) Appl. No.: 17/657,823

(22) Filed: Apr. 4, 2022

(65) Prior Publication Data

US 2022/0230235 A1 Jul. 21, 2022

Related U.S. Application Data

(63) Continuation of application No. 14/183,266, filed on Feb. 18, 2014, now Pat. No. 11,328,349.

(51) Int. Cl.
*G06Q 40/00* (2023.01)
*G06T 19/00* (2011.01)

(52) U.S. Cl.
CPC ........... *G06Q 40/00* (2013.01); *G06T 19/006* (2013.01)

(58) Field of Classification Search
CPC ........ G06Q 40/00; G06Q 40/02; G06Q 20/10; G06Q 20/40; G06Q 20/102; G06Q 20/105; G06Q 20/108; G06Q 20/1085

USPC .................................................... 705/39–45
See application file for complete search history.

(56) References Cited

U.S. PATENT DOCUMENTS

| | | |
|---|---|---|
| 8,156,115 B1 | 4/2012 | Erol et al. |
| 10,032,225 B1 | 7/2018 | Fox et al. |
| 2012/0030577 A1 | 2/2012 | Akolkar et al. |
| 2012/0230577 A1* | 9/2012 | Calman .............. G06Q 20/0425 382/138 |
| 2014/0076965 A1 | 3/2014 | Becorest et al. |
| 2014/0118560 A1 | 5/2014 | Bala et al. |
| 2014/0139637 A1 | 5/2014 | Mistry et al. |
| 2016/0033770 A1 | 2/2016 | Fujimaki et al. |
| 2016/0049010 A1 | 2/2016 | Hinski |

OTHER PUBLICATIONS

Morgan, S.J. (2002). The architecture of information: A framework for the spatial design of a mobile augmented reality Interface (Order No. MQ77402). Available from ProQuest Dissertations and Theses Professional. https://dialog.proquest.com/professional/docview/304792450?accountid=1314 (Year: 2022).

\* cited by examiner

*Primary Examiner* — Hani M Kazimi
(74) *Attorney, Agent, or Firm* — Patterson + Sheridan, LLP (57) ABSTRACT

The disclosed embodiments provide an augmented reality system. The augmented reality system includes a camera that captures a set of images of one or more physical documents. The augmented reality system also includes a processing apparatus that enables use of the augmented reality system by a user in performing financial management associated with data in the one or more physical documents.

20 Claims, 7 Drawing Sheets

FIG. 1 tax summary
take a photo
talk to accountant
ask tax question
identify document

FIG. 2A

Form W-2, a United States federal tax form issued by employers and stating how much an employee was paid in a year More (via TurboTax Community)

FINANCIAL MANAGEMENT USING AUGMENTED REALITY SYSTEMS

CROSS-REFERENCE TO RELATED APPLICATIONS

This application is a continuation of co-pending U.S. patent application Ser. No. 14/183,266, filed Feb. 18, 2014, the contents of which are incorporated herein by reference in their entirety.

INTRODUCTION

The disclosed embodiments relate to financial management. More specifically, the disclosed embodiments relate to techniques for facilitating financial management using augmented reality systems.

Financial-management applications may be used by individuals, small businesses, and/or organizations to perform financial transactions and/or manage finances. For example, a small business owner may use business-accounting software to generate payrolls, track inventory, manage invoices, track financial transactions, and/or generate reports. Similarly, an individual may use a tax-preparation application to prepare and file income taxes.

During use of a financial-management application, financial transactions may be carried out by transmitting, exchanging, and/or processing data (e.g., invoices, estimates, purchase orders, bills, statements, receipts, etc.) related to the financial transactions. Moreover, the financial transactions may be performed using digital financial data, which may include digital documents, digital representations (e.g., images, scans, etc.) of physical documents, and/or data from physical documents that is entered into the financial-management application by a user. In other words, use of financial-management applications may require financial data from physical documents to be manually digitized before the financial data can be used or processed by the financial-management application.

Moreover, the digitized data may be separated from the physical documents from which the data was obtained. As a result, changes to either the physical or digitized data may not be reflected in the other set of data unless the changes are manually propagated to the other set by the user. For example, the user may maintain a physical record of expenditures and update the record as the user spends money at gas stations, grocery stores, and/or other places. The user may also use a budgeting application to track the user's spending, which may automatically be updated with the user's credit card transactions as the transactions are posted. On the other hand, the budgeting application may lack information related to the user's cash spending unless the user adds cash expenditures from the physical record to the budgeting application.

Consequently, use of financial-management applications may be facilitated by mechanisms for combining, integrating, and/or synchronizing physical and digital data associated with the financial-management applications.

SUMMARY

The disclosed embodiments provide an augmented reality system. The augmented reality system includes a camera that captures a set of images of one or more physical documents. The augmented reality system also includes a processing apparatus that enables use of the augmented reality system by a user in performing financial management associated with data in the one or more physical documents.

In some embodiments, enabling use of the augmented reality system in performing financial management associated with the data in the one or more physical documents involves at least one of: identifying the one or more physical documents; extracting the data from the one or more physical documents; selecting a subset of the data; performing one or more operations on the data; enabling collaboration between the user and another user on the data; and associating the data with metadata.

In some embodiments, the one or more physical documents are identified by at least one of the user and the augmented reality system.

In some embodiments, the one or more operations include a mathematical operation, a data-visualization operation, and/or a data-storage operation.

In some embodiments, the metadata is associated with at least one of a location, a category, a tag, a line item, a timestamp, a field, and an identifier.

In some embodiments, extracting the data from the one or more physical documents involves performing optical character recognition on the set of images to obtain a digital representation of the data, and updating the digital representation with data from one or more new images in the set of images.

In some embodiments, use of the augmented reality system by the user in performing financial management is enabled using at least one of the set of images, a user interface, an input device, a sensor, a set of voice commands, and a set of gestures.

In some embodiments, the one or more physical documents include at least one of a receipt, a form, a bill, an invoice, a statement, an estimate, an expense, an inventory record, a check, and a paystub.

BRIEF DESCRIPTION OF THE DRAWINGS

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating financial management. More specifically, the disclosed embodiments provide a method and system for performing financial management using an augmented reality system. A camera on the augmented reality system may be used to capture a set of images of one or more physical documents in a user's vicinity. The augmented reality system may then be used to perform financial management associated with data in the physical document(s). For example, the augmented reality system may be used to identify the physical document(s), extract data from the physical document(s), select a subset of the data, perform one or more operations on the data, enable collaboration between the user and another user on the data, and/or associate the data with metadata.

Figure 1:
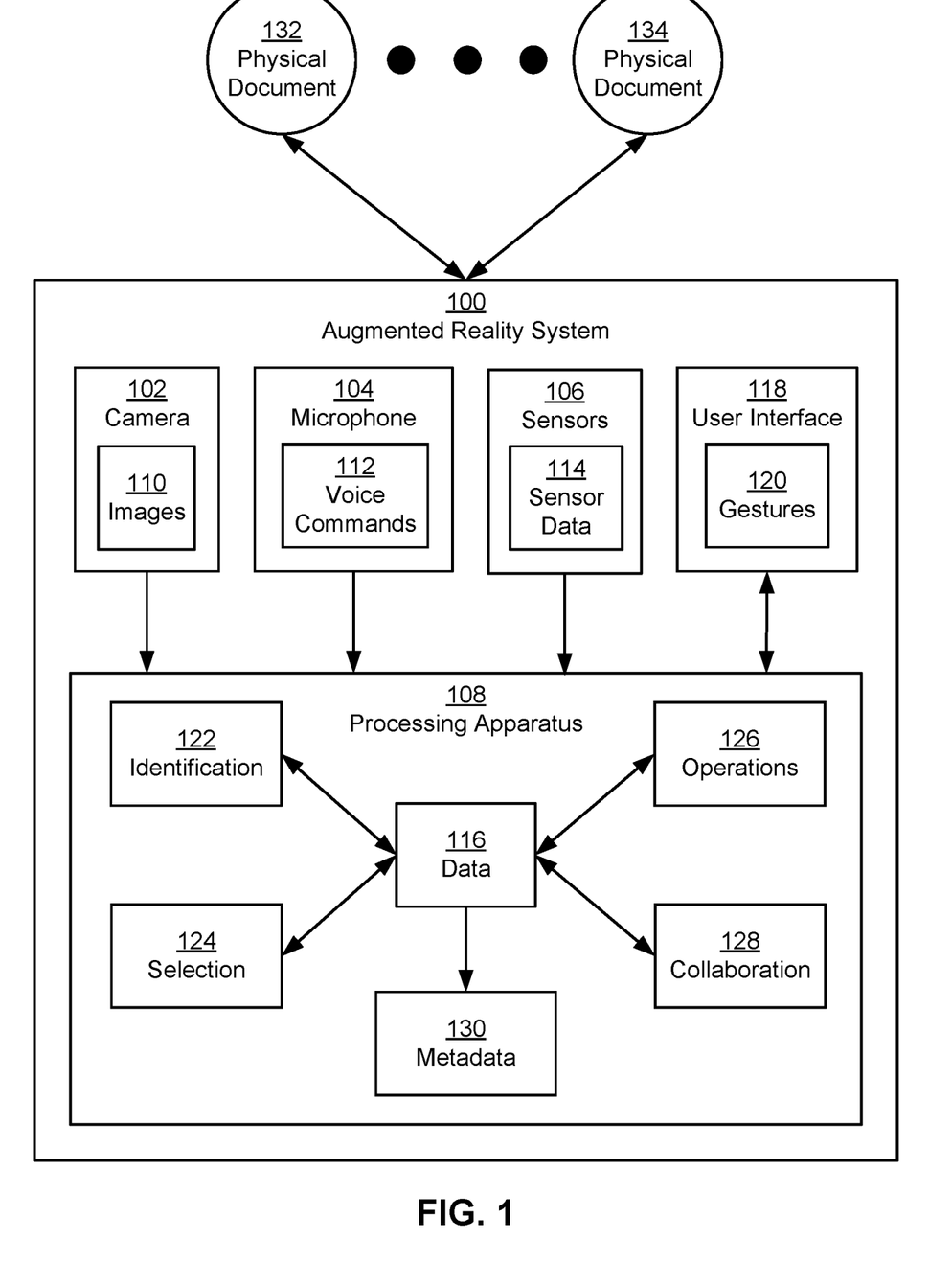
FIG. 1 shows an augmented reality system in accordance with the disclosed embodiments.

As shown in FIG. 1, an augmented reality system 100 may include a camera 102, a microphone 104, a set of sensors 106, a user interface 118, and a processing apparatus 108 (e.g., processor). Augmented reality system 100 may be worn by a user using a head-mounted display, helmet-mounted display, and/or contact lenses. Alternatively, augmented reality system 100 may be provided by an electronic device that is held by the user and/or physically separate from the user, such as a mobile phone, tablet computer, virtual table, and/or projector.

Augmented reality system 100 may be used with one or more physical documents 132-134 in the user's vicinity. Physical documents 132-134 may include receipts, forms, bills, invoices, statements, estimates, expenses, inventory records, checks, reports, and/or paystubs. As a result, data 116 from physical documents 132-134 may be used to manage finances for the user. For example, the user may use physical documents 132-134 to update his/her financial records, file taxes, run payroll, manage inventory, manage a budget, apply for a loan, pay a bill, deposit a check, interact with a customer, transfer money, and/or submit business expenses.

Those skilled in the art will appreciate that use of physical documents 132-134 with a conventional financial-management application may require manual digitization of data 116 from physical documents 132-134 before data 116 can be used by the financial-management application. For example, the user may be required to scan physical documents 132-134, take images of physical documents 132-134, and/or manually enter data 116 from physical documents 132-134 into the financial-management application before the user is able to perform tasks using data 116.

The existence of data 116 in both physical and digital form may additionally require changes associated with one form of data 116 to be manually propagated to the other form. For example, the user may create an invoice by hand and scan the invoice into the financial-management application to maintain a record of the invoice with the financial-management application. Prior to sending the invoice to a recipient, the user may find an error in the invoice and create a new version of the invoice that does not contain the error. The user may then be required to scan the new version into the financial-management application to correct the error in the record.

In one or more embodiments, augmented reality system 100 facilitates financial management for the user by performing processing related to the financial management using data 116 obtained during the user's interaction with physical documents 132-134 and/or other elements of the physical world. While the user interacts with physical documents 132-134, camera 102 may capture a set of images 110 of physical documents 132-134. Next, processing apparatus 108 and/or other components of augmented reality system 100 may enable use of augmented reality system 100 by the user in performing financial management associated with data 116 in physical documents 132-134.

More specifically, processing apparatus 108 may use images 110 to extract data 116 from physical documents 132-134. During extraction of data 116, processing apparatus 108 may perform optical character recognition (OCR) on images 110 to obtain a digital representation of data 116. For example, processing apparatus 108 may use OCR to identify words, numbers, characters, and/or other text-based data 116 in physical documents 132-134. Processing apparatus 108 may also include functionality to perform facial recognition, object recognition, feature detection, and/or other types of image processing to enhance data 116 with information related to the user's environment and/or other parts of physical documents 132-134. Processing apparatus 108 may further supplement data 116 with sensor data 114 from sensors 106 (e.g., accelerometer, gyroscope, Global Positioning System (GPS) receiver, magnetometer, proximity sensor, ambient light sensor, etc.) in augmented reality system 100.

Processing apparatus 108 may also update the digital representation of data 116 with additional data from one or more new images 110. For example, processing apparatus 108 may analyze images 110 from camera 102 as the images are taken to obtain different views of physical documents 132-134 and/or other objects in the user's environment. Processing apparatus 108 may then update data 116 with data extracted from new images 110 of previously obscured parts of physical documents 132-134 and/or new physical documents in the user's environment.

After data 116 is extracted, processing apparatus 108 may enable interaction with data 116 for the user. In particular, processing apparatus 108 may allow the user to interact with data 116 through a set of voice commands 112 and/or gestures 120. Voice commands 112 may be received by microphone 104, and gestures 120 may be received through user interface 118, which may be provided by input/output (I/O) devices such as camera 102, microphone 104, sensors 106, a display, and/or a touch-sensitive device (e.g., touchpad, touchscreen).

During interaction with data 116, the user may perform identification 122 of one or more physical documents 132-134 and/or data 116 within physical documents 132-134. For example, the user may request identification 122 of a tax form using a voice command, and processing apparatus 108 may match data 116 (e.g., text, features, boxes, etc.) extracted from the tax form to a layout and/or template for a known tax form. Alternatively, the user may provide identification 122 to augmented reality system 100, and processing apparatus 108 may update data 116 with identification 122. For example, the user may identify a physical document as an invoice, and processing apparatus 108 may update data 116 extracted from the physical document with an identifier describing the physical document as an invoice. Processing apparatus 108 may also analyze data 116 to facilitate automatic identification 122 of subsequent invoices from the user.

The user may also make a selection 124 of a subset of data 116. For example, the user may make selection 124 by requesting the extraction and/or use of data 116 associated with a particular physical document. The user may also specify selection 124 for data within the physical document by providing a gesture that circles and/or highlights one or more data elements (e.g., numbers, words, rows, columns, boxes, paragraphs, pages, etc.) of the physical document. Processing apparatus 108 may identify the gesture and associated data elements by processing images 110 associated with the gesture and include the subset of data 116 extracted from the data elements in selection 124.

The user may additionally perform one or more operations 126 on data 116 and/or selection 124. For example, the user may use voice commands 112, gestures 120, and/or other input to perform mathematical operations such as arithmetic operations, statistical calculations, geometric calculations, and/or financial calculations. The user may also use the input to perform a data-visualization operation, such as generating a chart, table, and/or graph from data 116 and/or selection 124. Results from the mathematical and/or data-visualization operations may be added to data 116 to facilitate further processing, understanding, and/or use of data 116 associated with physical documents 132-134. The user may also perform a data-storage operation that saves data 116 to storage on augmented reality system 100, a cloud computing system, a financial-management application, and/or another device or location.

Processing apparatus 108 may also enable collaboration 128 between the user and one or more other users on data 116. For example, processing apparatus 108 may use microphone 104 and/or wireless networking functionality on augmented reality system 100 to connect the user with the other user(s) and allow the users to discuss data 116 and/or physical documents 132-134. In addition, the user's view of physical documents 132-134 (e.g., as obtained by camera 102) may be provided to the other users to allow the other users to view real-time representations of physical documents 132-134 and/or other objects in the user's environment.

Finally, the user may associate data 116 with metadata 130. As mentioned above, the user may perform identification 122 of a physical document and/or a portion of the physical document. In turn, identification 122 may be included as an identifier for the physical document and/or portion in metadata 130 describing the physical document and/or portion. The user may also provide other types of metadata 130, such as metadata 130 associated with a location (e.g., as obtained by a GPS receiver and/or other sensor in augmented reality system 100), a category (e.g., type of data 116, type of physical document, etc.), a tag (e.g., user, event, context, etc.), a timestamp, a line item (e.g., personal expense, business expense, etc.), and/or a field (e.g., from a form).

By monitoring and analyzing the user's environment during the user's interaction with physical documents 132-134, augmented reality system 100 may allow the user to process, use, and update data 116 from physical documents 132-134 in both physical and digital form. In turn, augmented reality system 100 may streamline financial management associated with physical documents 132-134 for the user. For example, augmented reality system 100 may allow the user to quickly select the amounts due from a set of utility bills, add up the total amounts, and store the sum in the user's financial records. Augmented reality system 100 may further expedite processing of the total amounts by identifying the position of the total amount in the first utility bill and using the position to automatically extract the total amounts from the remaining utility bills. In another example, augmented reality system 100 may allow the user to identify line items in a receipt as personal or business expenses immediately after receiving the receipt. The user may then add the business expenses to an expense report and submit the expense report through augmented reality system 100 without manually scanning the receipt, taking an image of the receipt, and/or entering line item amounts from the receipt into the expense report.

Figure 2A:
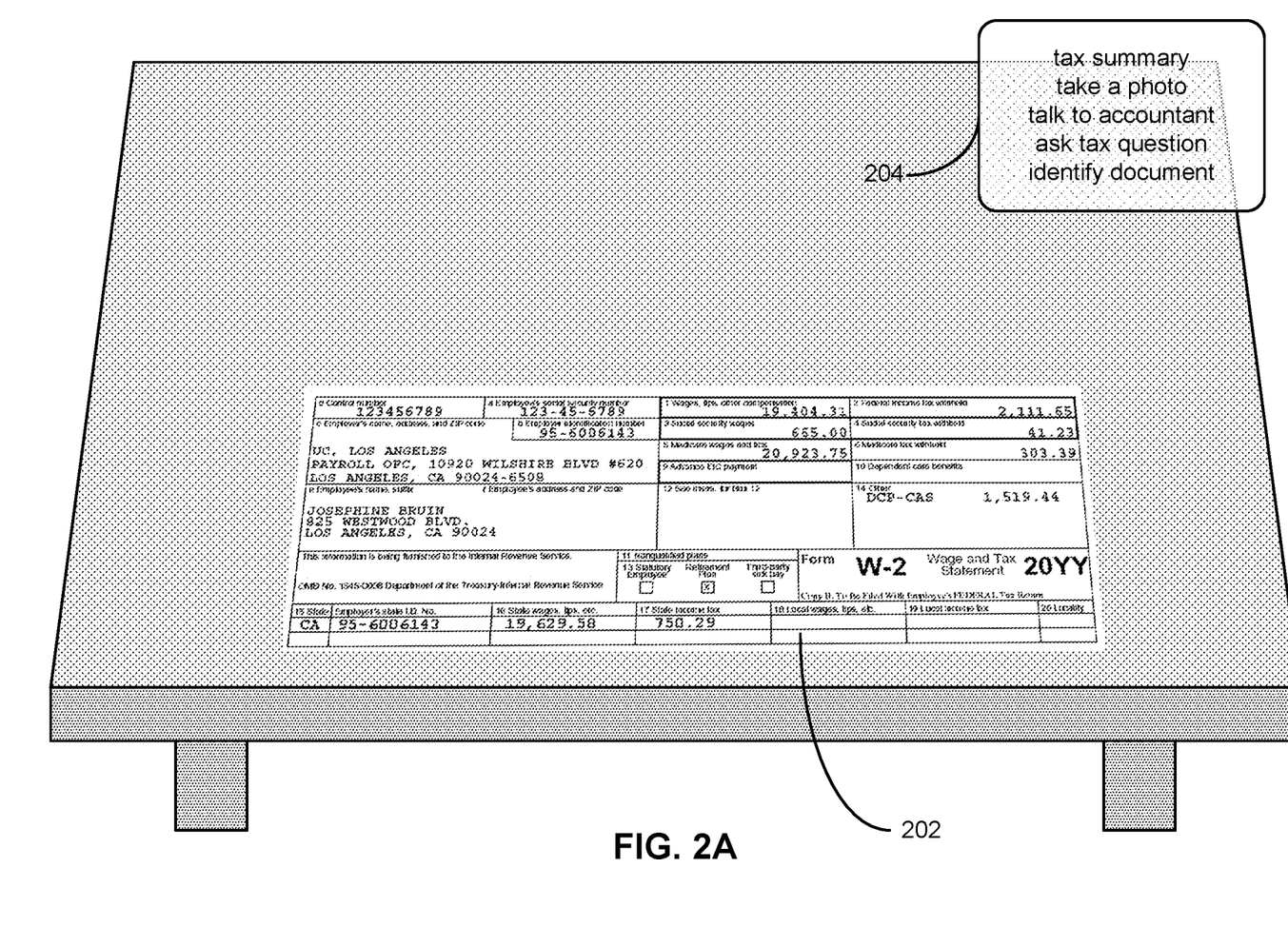
FIG. 2A shows the exemplary use of an augmented reality system in accordance with the disclosed embodiments.

FIG. 2A shows the exemplary use of an augmented reality system (e.g., augmented reality system 100 of FIG. 1) in accordance with the disclosed embodiments. More specifically, FIG. 2A shows a view associated with the augmented reality system. As shown in FIG. 2A, a physical document 202 is visible within the view. For example, physical document 202 may be placed on a table while a user is seated or standing in front of the table and wearing the augmented reality system.

Data from physical document 202 may automatically be extracted using one or more images captured by a camera in the augmented reality system. The data may also be supplemented with data from one or more sensors in the augmented reality system and/or analysis of the user's environment, as captured in the images. Alternatively, the data may not be extracted until the user provides a gesture and/or voice command that triggers the extraction of data from physical document 202.

To facilitate use of the augmented reality system with physical document 202, a user-interface element 204 may be overlaid on the view (e.g., using a display of the augmented reality system). User-interface element 204 may provide the user with a set of options for using the augmented reality system. For example, user-interface element 204 may provide options that include "tax summary," "take a photo," "talk to accountant," "ask tax question," and/or "identify document." The user may select an option by providing a voice command containing the option and/or a gesture corresponding to the option. The voice command and/or gesture may be detected by the camera, a microphone, and/or a touch-sensitive device in the augmented reality system. The voice command and/or gesture may then be processed by the augmented reality system and used to perform one or more tasks for the user.

Figure 2B:
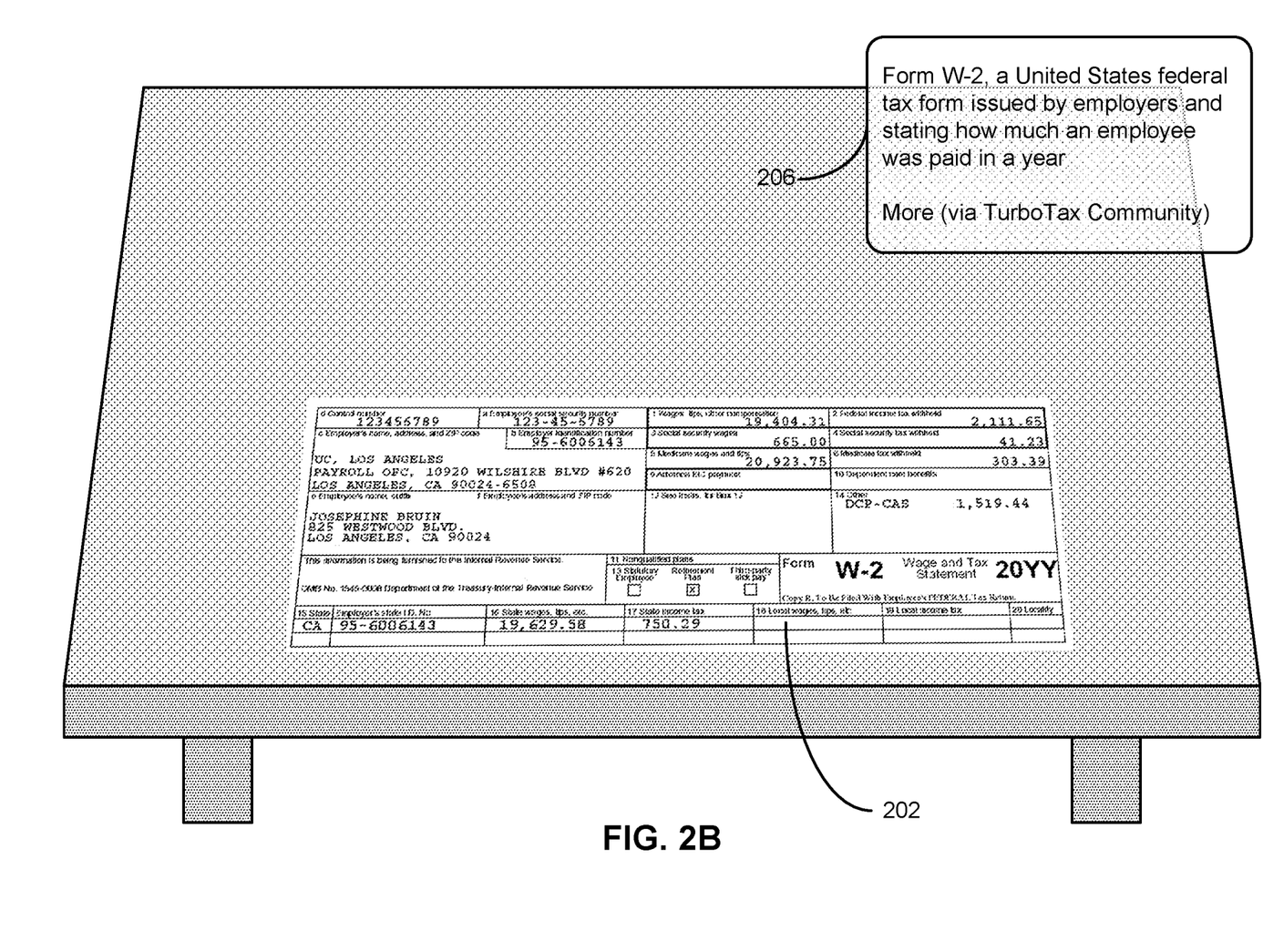
FIG. 2B shows the exemplary use of an augmented reality system in accordance with the disclosed embodiments.

FIG. 2B shows the exemplary use of an augmented reality system in accordance with the disclosed embodiments. More specifically, FIG. 2B shows a view associated with the augmented reality system of FIG. 2A after the user has specified the "identify document" option from user-interface element 204.

In response to the specified option, the augmented reality system may extract and/or analyze data from physical document 202 to identify physical document 202. Once physical document 202 is identified, the augmented reality system may display identifying information (e.g., "Form W-2, a United States federal tax form issued by employers and stating how much an employee was paid in a year") for physical document 202 in a new user-interface element 206. User-interface element 206 may also include an option for learning more about physical document 202 (e.g., "More (via TurboTax Community)"). The user may select the option using a voice command and/or gesture, or the user may provide a different command to perform a different task. For example, the user may use the augmented reality system to update his/her tax summary with data from physical document 202, take a photo of physical document 202, talk to an accountant about physical document 202 and/or tax filing, view a visualization (e.g., graph, chart, table, etc.) of data in physical document 202, and/or ask a tax question.

Figure 3A:
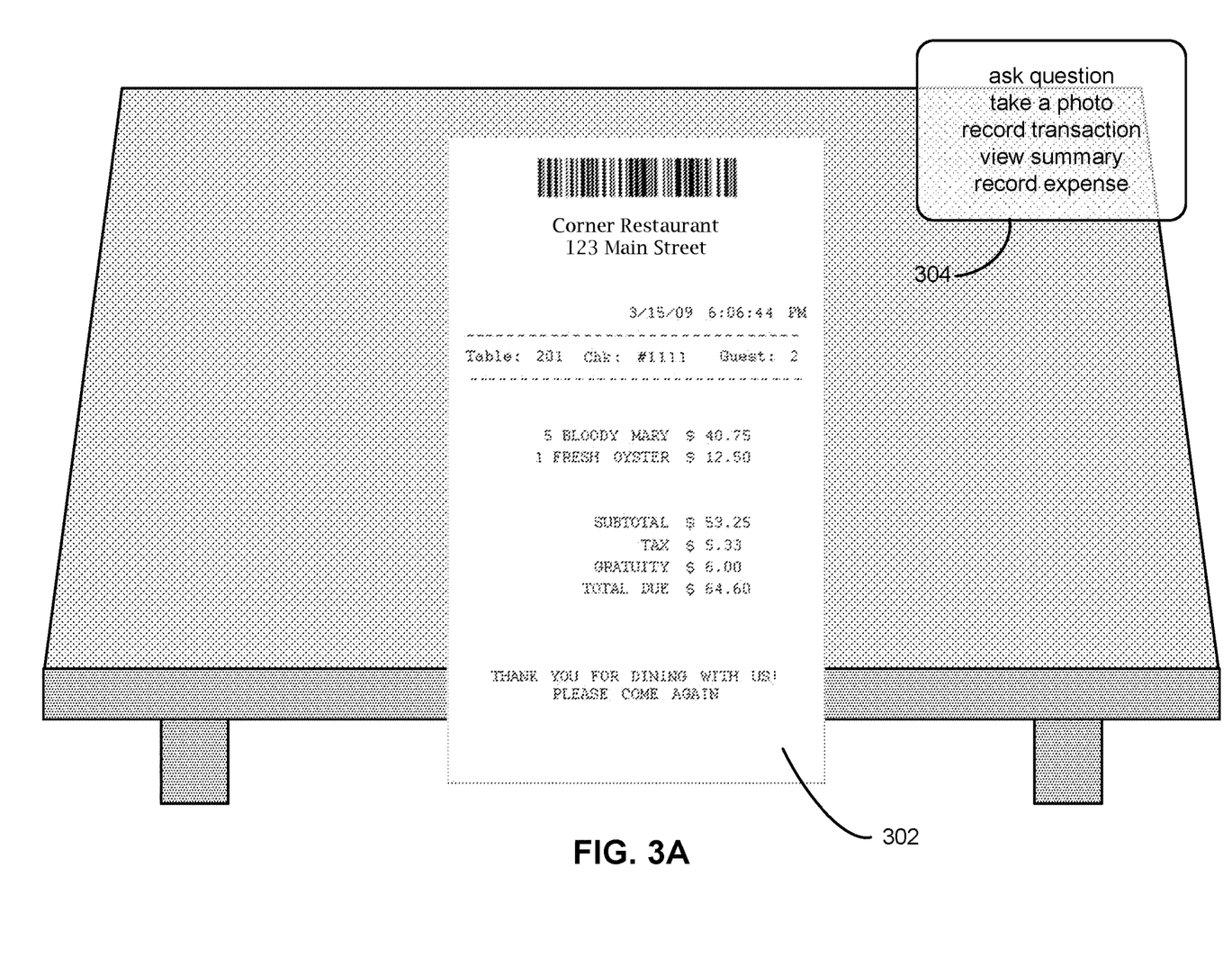
FIG. 3A shows the exemplary use of an augmented reality system in accordance with the disclosed embodiments.

FIG. 3A shows the exemplary use of an augmented reality system (e.g., augmented reality system 100 of FIG. 1) in accordance with the disclosed embodiments. In particular, FIG. 3A shows a view associated with the augmented reality system. Like the views of FIGS. 2A-2B, the view of FIG. 3A includes a physical document 302. For example, a user may hold a receipt corresponding to physical document 302 up to his/her face and/or a head-mounted augmented reality system to examine the contents of physical document 302 while seated at a table.

The view of FIG. 3A also includes a user-interface element 304 with a different set of options from user-interface elements 204-206 of FIGS. 2A-2B. User-interface element 304 may include an "ask question" option, a "take a photo" option, a "record transaction" option, a "view summary" option, and a "record expense" option. As a result, data from physical document 302 may be used to perform a different type of financial management than data from physical document 202 in FIGS. 2A-2B. For example, data from physical document 302 may be used in expense reporting and/or budget tracking instead of tax preparation.

Figure 3B:
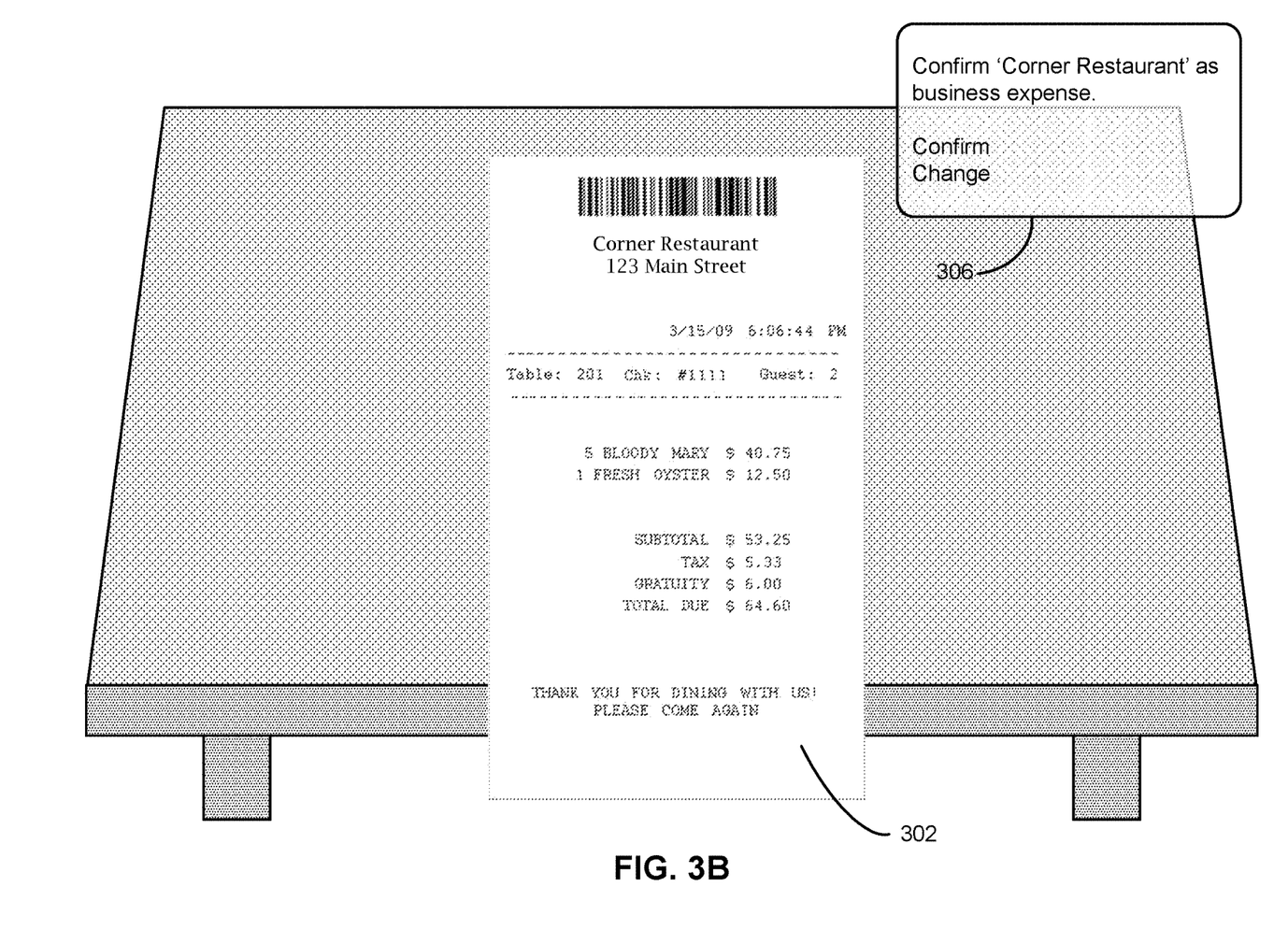
FIG. 3B shows the exemplary use of an augmented reality system in accordance with the disclosed embodiments.

FIG. 3B shows the exemplary use of an augmented reality system in accordance with the disclosed embodiments. More specifically, FIG. 3B shows a view associated with the augmented reality system of FIG. 3A after the user has specified the "record expense" option from user-interface element 304.

To carry out the user's specified option, the augmented reality system may extract data from physical document 302 to identify details associated with a business expense. For example, the augmented reality system may extract a business name (e.g., "Corner Restaurant") and/or location (e.g., "123 Main Street") from physical document 302. The augmented reality system may also extract line items and/or the total amount due from physical document 302.

The augmented reality system may also display a new user-interface element 306 that prompts the user to "Confirm 'Corner Restaurant' as business expense" and provides options for confirming or changing the business expense. The user may select one of the provided options and/or specify other options related to expense management. For example, the user may identify individual line items in physical document 302 as personal or business expenses. The user may also add the line items, total amount, and/or other data from physical document 302 to an expense report, view the expense report, view a visualization and/or graphical representation of expenses and/or other metrics associated with the expense report, and/or submit the expense report.

Figure 4:
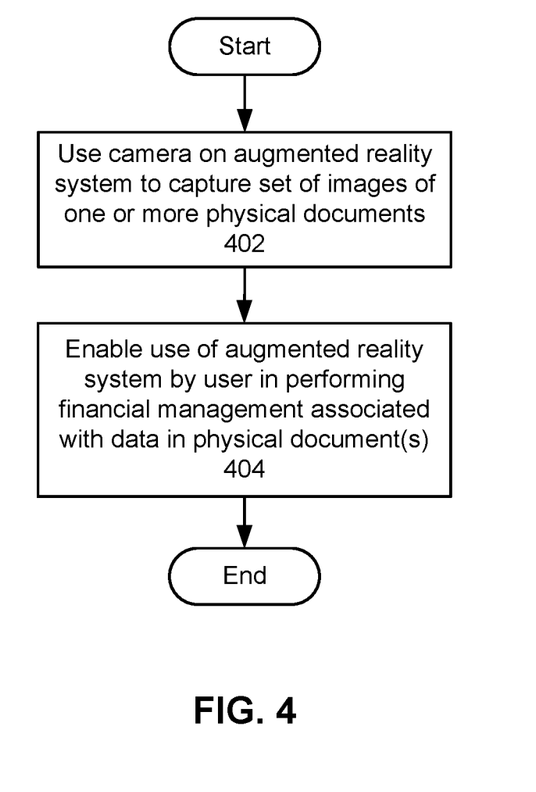
FIG. 4 shows a flowchart illustrating the process of facilitating financial management in accordance with the disclosed embodiments.

FIG. 4 shows a flowchart illustrating the process of facilitating financial management in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a camera on an augmented reality system is used to capture a set of images of one or more physical documents (operation 402). For example, the camera may capture the images during interaction with the physical document(s) by a user of the augmented reality system. As a result, the images may contain the physical document(s), as well as other elements of the user's environment.

Next, use of the augmented reality system by the user in performing financial management associated with data in the physical document(s) is enabled (operation 404). The augmented reality system may enable such financial-management functionality using the set of images, a user interface, an input device, a sensor, a set of voice commands, and/or a set of gestures. In addition, the user may use the augmented reality system to identify the physical document(s), extract the data from the physical document(s), select a subset of the data, perform one or more operations on the data, enable collaboration between the user and another user on the data, and/or associate the data with metadata.

For example, the user may request identification of a physical document from the augmented reality system or provide the identification to the augmented reality system. During extraction of data from the physical document, the augmented reality system may perform OCR on the set of images to obtain a digital representation of the data and update the digital representation with data from one or more new images in the set of images. After the data is extracted, the user may perform a mathematical operation, a data-visualization operation, and/or a data-storage operation on the data. The user may also provide metadata for the data, which may be associated with a location, a category, a tag, a line item, a timestamp, a field, and/or an identifier.

Figure 5:
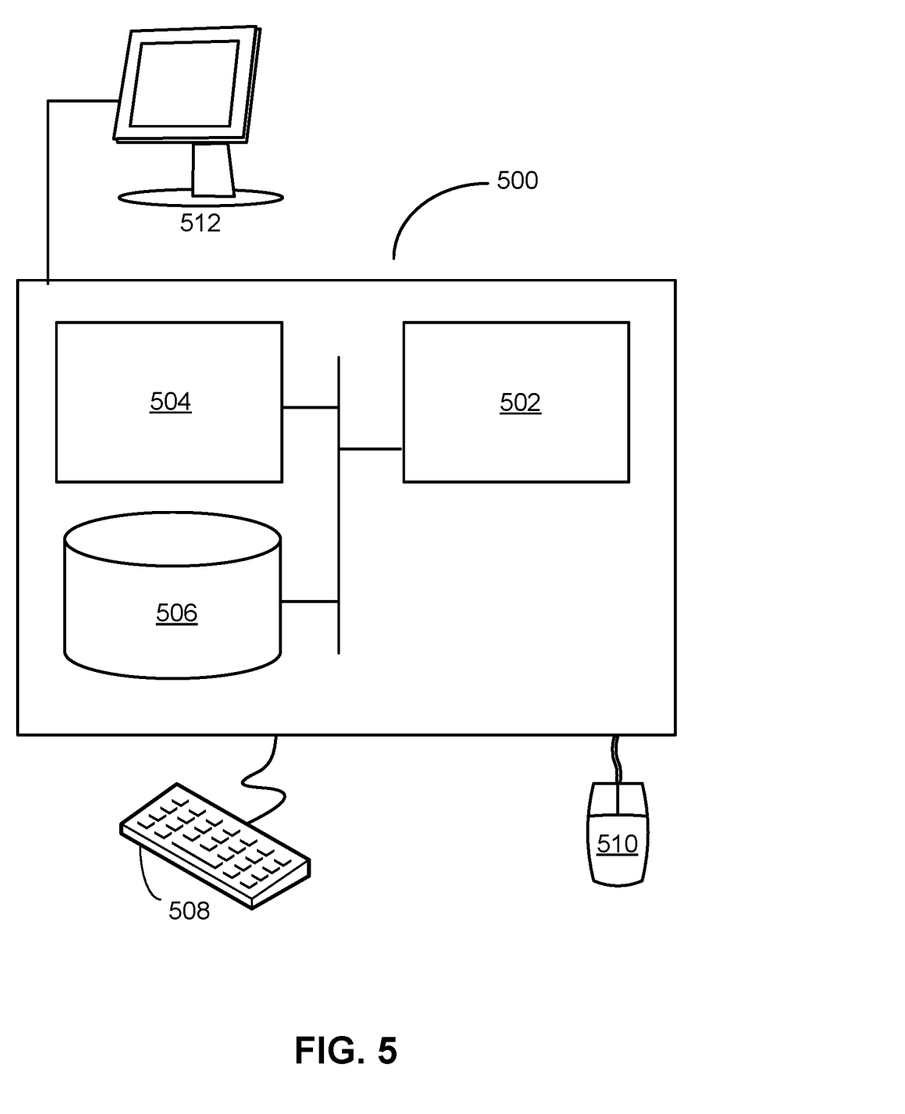
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices such as personal computers, laptop computers, workstations, servers, mobile phones, tablet computers, and/or portable media players. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for performing financial management using an augmented reality system. The system may include a camera that captures a set of images of one or more physical documents. The system may also include a processing apparatus that enables use of the augmented reality system by a user in performing financial management associated with data in the one or more physical documents.

In addition, one or more components of computer system 500 may be remotely located and connected to the other components over a network. Portions of the present embodiments (e.g., camera, processing apparatus, microphone, sensors, user interface, etc.) may also be located on different nodes of a distributed system that implements the embodiments. For example, the present embodiments may be implemented using a cloud computing system that facilitates financial management for a set of remote users using a set of remote augmented reality systems.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for using an augmented reality system, comprising:
   displaying an image of an augmented reality environment including a physical document on a display device of the augmented reality system based on image data captured by a camera of the augmented reality system;
   overlaying on the display device, while displaying the image of the augmented reality environment including the physical document, a first user interface element comprising a set of command options for interacting with the physical document in the augmented reality environment;
   receiving a gesture via the display device, wherein:
      the display device is a touch-sensitive display device, and
      the gesture is received via the touch-sensitive display device;
   associating the gesture with a command option of the set of command options overlaid on the display device; and
   in response to receiving the gesture:
      determining, by a processor of the augmented reality system, a digital representation of one or more parts of the physical document based on the image of the physical document displayed in the augmented reality environment;
      performing, by the processor, an operation related to the digital representation based on the command option; and
      displaying a result of the operation on the display device.

2. The method of claim 1, further comprising:
   receiving, via the camera, new image data of the physical document in the augmented reality environment, wherein the new image data comprises one or more new parts of the physical document; and
   updating the digital representation based on the new image data.

3. The method of claim 1, further comprising:
   selecting, based on the command option, one or more data elements in the digital representation of the physical document displayed in the augmented reality environment,
   wherein the operation performed by the processor is based on the selected one or more data elements.

4. The method of claim 1, wherein:
   the command option comprises a command to identify the physical document displayed in the augmented reality environment,
   the operation comprises determining a document type associated with the physical document based on one or more of text and features of the physical document, and
   the result of the operation comprises displaying a second user interface element on the display device comprising a document type associated with the physical document.

5. The method of claim 1, wherein:
   the command option comprises a command to generate a data visualization based on the physical document displayed in the augmented reality environment,
   the operation comprises generating the data visualization based the digital representation of the physical document displayed in the augmented reality environment, and
   the result of the operation comprises displaying the data visualization on the display device.

6. The method of claim 1, wherein:
   the digital representation comprises one or more data elements related to the physical document displayed in the augmented reality environment, and
   the method further comprises:
      determining a position on the physical document displayed in the augmented reality environment corresponding to one of the one or more data elements in the digital representation;
      receiving, via the camera, new image data of a second physical document in the augmented reality environment; and
      determining a digital data value for a data element based on text in the second physical document at the determined position.

7. The method of claim 1, wherein the augmented reality system comprises one of a mobile phone or a tablet computer.

8. The method of claim 1, wherein the gesture comprises a selection of one or more data elements of the physical document.

9. The method of claim 8, wherein performing the operation related to the digital representation comprises performing an action with respect to the one or more data elements.

10. An augmented reality system, comprising:
    a camera configured to capture image data;
    a display device configured to display image data; and
    a processor in data communication with the camera and the display device, and configured to cause the augmented reality system to:
       display an image of an augmented reality environment including a physical document on the display device based on image data captured by the camera;
       overlay on the display device, while displaying the image of the augmented reality environment including the physical document, a first user interface element comprising a set of command options for interacting with the physical document in the augmented reality environment;

receive a gesture via the display device, wherein:
the display device is a touch-sensitive display device, and
the gesture is received via the touch-sensitive display device;
associate the gesture with a command option of the set of command options overlaid on the display device; and
in response to receiving the gesture:
determine a digital representation of one or more parts of the physical document based on the image of the physical document displayed in the augmented reality environment;
perform an operation related to the digital representation based on the command option; and
display a result of the operation on the display device.

11. The augmented reality system of claim 10, wherein the processor is further configured to cause the augmented reality system to:
receive, via the camera, new image data of the physical document in the augmented reality environment, wherein the new image data comprises one or more new parts of the physical document; and
update the digital representation based on the new image data.

12. The augmented reality system of claim 10, wherein the processor is further configured to cause the augmented reality system to:
select, based on the command option, one or more data elements in the digital representation of the physical document displayed in the augmented reality environment,
wherein the operation performed by the processor is based on the selected one or more data elements.

13. The augmented reality system of claim 10, wherein:
the command option comprises a command to identify the physical document displayed in the augmented reality environment,
the operation comprises determining a document type associated with the physical document based on one or more of text and features of the physical document, and
the result of the operation comprises displaying a second user interface element on the display device comprising a document type associated with the physical document.

14. The augmented reality system of claim 10, wherein:
the command option comprises a command to generate a data visualization based on the physical document displayed in the augmented reality environment,
the operation comprises generating the data visualization based the digital representation of the physical document displayed in the augmented reality environment, and
the result of the operation comprises displaying the data visualization on the display device.

15. The augmented reality system of claim 10, wherein:
the digital representation comprises one or more data elements related to the physical document displayed in the augmented reality environment, and
the processor is further configured to:
determine a position on the physical document displayed in the augmented reality environment corresponding to one of the one or more data elements in the digital representation;
receive, via the camera, new image data of a second physical document in the augmented reality environment; and
determine a digital data value for a data element based on text in the second physical document at the determined position.

16. The augmented reality system of claim 10, wherein the augmented reality system comprises one of a mobile phone or a tablet computer.

17. The augmented reality system of claim 10, wherein the gesture comprises a selection of one or more data elements of the physical document.

18. The augmented reality system of claim 17, wherein performing the operation related to the digital representation comprises performing an action with respect to the one or more data elements.

19. A method for using an augmented reality system, comprising:
displaying an image of an augmented reality environment including a physical document on a display device of the augmented reality system based on image data captured by a camera of the augmented reality system;
overlaying on the display device, while displaying the image of the augmented reality environment including the physical document, a first user interface element comprising a set of command options for interacting with the physical document in the augmented reality environment;
receiving a gesture via the display device, wherein:
the display device is a touch-sensitive display device, and
the gesture comprises circling or highlighting on or more data elements of the physical document via the touch-sensitive display device;
associating the gesture with a command option of the set of command options overlaid on the display device; and
in response to receiving the gesture:
determining, by a processor of the augmented reality system, a digital representation of one or more parts of the physical document based on the image of the physical document displayed in the augmented reality environment;
performing, by the processor, an operation related to the digital representation based on the command option; and
displaying a result of the operation on the display device.

20. The method of claim 19, further comprising:
receiving, via the camera, new image data of the physical document in the augmented reality environment, wherein the new image data comprises one or more new parts of the physical document; and
updating the digital representation based on the new image data.

* * * * *